United States Patent
Jeanrenaud et al.

(10) Patent No.: US 11,687,040 B2
(45) Date of Patent: Jun. 27, 2023

(54) COMPOSITE TIMEPIECE OR JEWELLERY COMPONENT WITH PROTECTION FOR THE SUBSTRATE AND ITS DECORATION

(71) Applicant: OMEGA SA, Biel/Bienne (CH)

(72) Inventors: Frederic Jeanrenaud, La Chaux-de-Fonds (CH); Gregory Kissling, La Neuveville (CH)

(73) Assignee: OMEGA SA, Biel/Bienne (CH)

( * ) Notice: Subject to any disclaimer, the term of this patent is extended or adjusted under 35 U.S.C. 154(b) by 543 days.

(21) Appl. No.: 16/816,310

(22) Filed: Mar. 12, 2020

(65) Prior Publication Data
US 2020/0292997 A1 Sep. 17, 2020

(30) Foreign Application Priority Data
Mar. 14, 2019 (EP) .................................. 19162938

(51) Int. Cl.
*G04B 45/00* (2006.01)
*B41F 17/00* (2006.01)
(Continued)

(52) U.S. Cl.
CPC ........ *G04B 45/0076* (2013.01); *B41F 17/001* (2013.01); *G04B 19/10* (2013.01); *G04B 45/0015* (2013.01); *B44C 1/18* (2013.01)

(58) Field of Classification Search
CPC ............... G04B 45/0076; G04B 19/10; G04B 45/0015; B41F 17/001; B44C 1/18
(Continued)

(56) References Cited

U.S. PATENT DOCUMENTS

| 2012/0244326 A1* | 9/2012 | Jeanrenaud | G04B 19/10 |
| | | | 428/209 |
| 2015/0289613 A1* | 10/2015 | Lauper | A44C 17/04 |
| | | | 63/26 |

(Continued)

FOREIGN PATENT DOCUMENTS

| CH | 269849 A | 7/1950 |
| CH | 697 210 A5 | 6/2008 |

(Continued)

OTHER PUBLICATIONS

Combined Chinese Office Action and Search Report dated Dec. 30, 2021 in Chinese Patent Application No. 202010175989.5 (with English translation of Category of Cited Documents), 11 pages.
(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A method for fabricating a composite timepiece or jewellery component: a base is made in a substrate with an apparent surface remaining visible; each visible apparent surface is mirror polished; each polished apparent surface is coated with a first transparent or coloured semi-transparent layer of a first material in a dry process, or PVD or CVD or ALD process, or lacquering or zapon varnish process; a decorative element is affixed and bonded to an external surface of the first layer; the first layer and each decorative element is coated with a second layer of a transparent treatment material in a dry process, or PVD or CVD or ALD process, or lacquering or zapon varnish process.

17 Claims, 1 Drawing Sheet

(51) Int. Cl.
  *G04B 19/10* (2006.01)
  *B44C 1/18* (2006.01)
(58) Field of Classification Search
  USPC .......................................................... 156/247
  See application file for complete search history.

(56) References Cited

U.S. PATENT DOCUMENTS

| | | | | |
|---|---|---|---|---|
| 2016/0176126 | A1* | 6/2016 | Kissling | B22F 10/66 |
| | | | | 428/156 |
| 2016/0263698 | A1* | 9/2016 | Noirot | B23K 26/359 |
| 2016/0266551 | A1* | 9/2016 | Oliveira | G04B 45/0076 |

FOREIGN PATENT DOCUMENTS

| | | | |
|---|---|---|---|
| CN | 1257588 | A | 6/2000 |
| CN | 1310101 | A | 8/2001 |
| CN | 105966139 | A | 9/2016 |
| CN | 105974767 | A | 9/2016 |
| CN | 109070229 | A | 12/2018 |
| DE | 6601730 | U | 4/1969 |
| EP | 1 674 236 | B1 | 7/2008 |
| EP | 3 067 150 | A1 | 9/2016 |
| EP | 3 067 150 | B1 | 9/2016 |
| EP | 3 320 799 | A1 | 5/2018 |
| EP | 3 320 799 | B1 | 5/2018 |
| EP | 3 336 614 | A1 | 6/2018 |
| EP | 3336614 | A1 * | 6/2018 ........... C23C 14/025 |
| JP | 07104075 | A * | 4/1995 |
| JP | 07104075 | A * | 4/1995 |
| JP | 10-153668 | A | 6/1998 |
| JP | 10-288677 | A | 10/1998 |
| JP | 2935593 | B2 | 8/1999 |
| JP | 2001-141844 | A | 5/2001 |
| JP | 2007-224331 | A | 9/2007 |
| JP | 2007-224331 | A | 9/2007 |
| JP | 2009-216517 | A | 9/2009 |
| JP | 2016-173361 | A | 9/2016 |

OTHER PUBLICATIONS

Combined Taiwanese Office Action and Search Report dated Oct. 7, 2020 in Taiwanese Patent Application No. 109105616 (submitting English translation only), 5 pages.
European Search Report dated Oct. 2, 2019 in European Application 19162938.5, filed on Mar. 14, 2019 (with English translation of categories of Cited Documents), 3 pages.
Office Action dated Mar. 9, 2021 in corresponding Japanese Patent Application No. 2020-032728 (with English Translation), 11 pages.
Office Action dated May 11, 2021 in corresponding Korean Patent Application No. 10-2020-0028289 (with English Translation), 14 pages.
Indian Office Action dated Nov. 26, 2021 in Indian Patent Application No. 202044010218, 5 pages.
Combined Chinese Office Action and Search Report dated Apr. 22, 2021 in Chinese Patent Application No. 202010175989.5 (with English translation of Category of Cited Documents), 13 pages.
Notice of the Reason for Refusal dated Jul. 13, 2021 in Japanese Patent Application No. 2020-032728 (with English language translation), 9 pages.

* cited by examiner

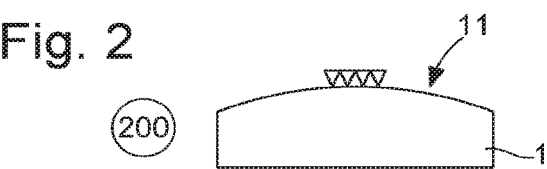
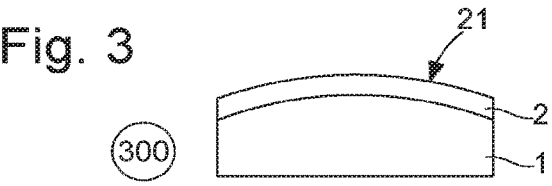
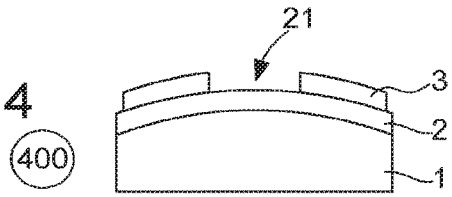
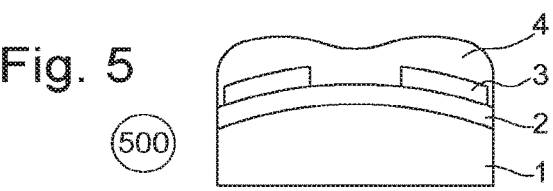
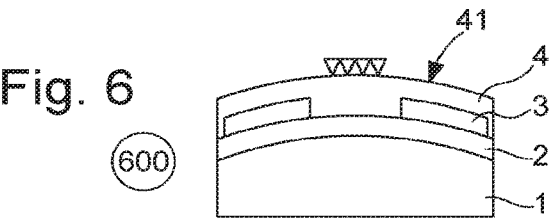
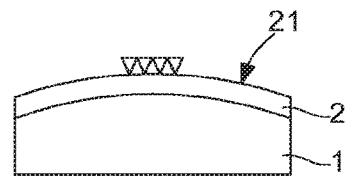
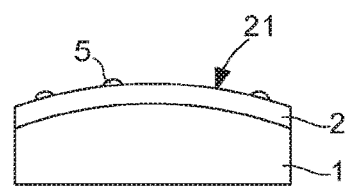
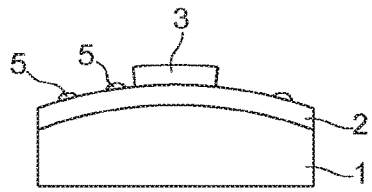
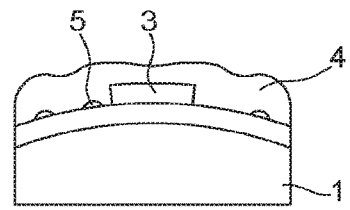
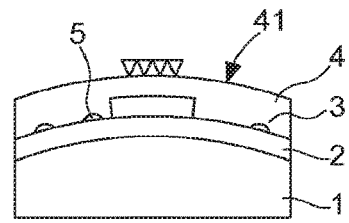
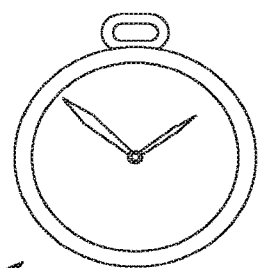

COMPOSITE TIMEPIECE OR JEWELLERY COMPONENT WITH PROTECTION FOR THE SUBSTRATE AND ITS DECORATION

CROSS-REFERENCE TO RELATED APPLICATION

This application claims priority to European Patent Application No. 19162938.5 filed on Mar. 14, 2019, the entire disclosure of which is hereby incorporated herein by reference.

FIELD OF THE INVENTION

The invention concerns a method for fabricating a composite timepiece or jewellery component comprising at least one decoration affixed to a substrate which has at least one apparent surface intended to remain visible.

The invention also concerns a watch including an external element and/or a dial made by this method.

The invention concerns the field of external or display components for horology, and the field of jewellery.

BACKGROUND OF THE INVENTION

The fabrication of certain timepiece or jewellery components comprising added components or decorations is often difficult when the base material reacts to humidity or temperature or to certain solvents.

This is, for example, the case of mother-of-pearl, or of other materials of animal or vegetable origin, which require particular precautions for fitting, for decoration and for protection over time of the actual substrate, and any decorations provided in such components.

SUMMARY OF THE INVENTION

The invention proposes to develop a method for fabricating a composite timepiece or jewellery component comprising at least one decoration affixed to a substrate which has at least one apparent surface intended to remain visible, which ensures the stability of the substrate and added decorations over time.

To this end, the invention concerns a method according to claim 1.

The invention also concerns a watch including a component made by this method.

The invention also concerns a piece of jewellery including a component made by this method.

BRIEF DESCRIPTION OF THE DRAWINGS

Other features and advantages of the invention will appear upon reading the following detailed description, with reference to the annexed drawings, in which:

FIGS. 1 to 11 represent schematic sectional views of the operating sequences of a method according to the invention:

FIG. 1 represents the making of a base;

FIG. 2 represents the mirror polishing of each apparent surface of the base intended to be seen by the user;

FIG. 3 represents a first coating operation wherein each polished apparent surface is coated with a deposition of a first transparent or coloured semi-transparent layer of a first material in a dry process, or PVD or CVD or ALD process, or lacquering or zapon varnish process.

FIG. 4 represents a first transfer operation of affixing and bonding at least one decorative element on a first external surface of the first layer;

FIG. 5 represents a second coating operation wherein the first layer and each decorative element carried by the first layer is coated with a deposition of a second layer of a transparent treatment material in a dry process, or PVD or CVD or ALD process, or lacquering or zapon varnish process;

FIG. 6 represents a final machining operation wherein geometric alignment is performed on the second layer and/or a polishing operation is performed on the second external surface of the second layer;

FIG. 7 represents, after the first coating operation, an intermediate machining operation wherein geometric alignment is performed on the first layer and/or a polishing operation is performed on the first external surface of the first layer;

FIG. 8 represents, prior to the execution of the second coating operation, a transfer operation wherein at least one marking is applied by pad printing to the first external surface of the first layer;

FIG. 9 represents a variant wherein, at the same time, at least one decorative element is affixed and bonded and at least one marking is transferred by pad printing, to a first external surface of the first layer;

FIG. 10 represents, in a similar manner to FIG. 5, a second coating operation wherein the first layer and each decorative element, added according to FIG. 9, is coated with a deposition of a second layer of a transparent treatment material in a dry process, or PVD or CVD or ALD process, or lacquering or zapon varnish process.

FIG. 11 represents, in a similar manner to FIG. 6, a final machining operation wherein geometric alignment is performed on the second layer of the blank of FIG. 10, and/or a polishing operation is performed on the second external surface of this second layer;

FIG. 12 represents a watch including a dial made and decorated by the method of the invention.

DETAILED DESCRIPTION OF PREFERRED EMBODIMENTS

The invention concerns a method for fabricating a composite timepiece or jewellery component comprising at least one decoration affixed to a substrate which has at least one apparent surface intended to remain visible, and wherein the following steps are performed in this order:

in an initial operation 100, making a base 1 in a substrate which has at least one apparent surface 11 intended to remain visible;

in a first polishing operation 200, mirror polishing each apparent surface 11 intended to be seen by the user;

performing a first coating operation 300 wherein each polished apparent surface 11 comprised in base 1 is coated with a deposition of a first transparent or coloured semi-transparent layer 2 of a first material in a dry process, or PVD or CVD or ALD process, or lacquering or zapon varnish process.

performing a first transfer operation 400 by affixing and bonding at least one decorative element 3 on a first external surface 21 of first layer 2;

performing a second coating operation 500 wherein first layer 2 and each decorative element 3 carried by first layer 2 is coated with a deposition of a second layer 4 of a transparent treatment material in a dry process, or PVD or CVD or ALD process, or lacquering or zapon varnish process.

According to a particular feature, after second coating operation 500, in a final machining operation 600, geometric alignment is performed on second layer 4 and/or a polishing operation is performed on second external surface 41 of second layer 4.

According to a particular feature, after first coating operation 300, an intermediate machining operation 320 is performed, wherein geometric alignment is performed on first layer 2 and/or a polishing operation is performed on first external surface 21 of first layer 2.

According to a particular feature, prior to the execution of second coating operation 500, a transfer operation 350 is performed, during which at least one marking 5 is applied by pad printing to first external surface 21 of first layer 2.

According to a particular feature, during initial operation 100, at least one apparent surface 11 is made on a warped surface with a particular curved shape, and, prior to performing first transfer operation 400, a warped sacrificial support is made, which corresponds to the particular curved shape to which at least one decorative element 3 is affixed with an adhesive fastening.

According to a particular feature, during intermediate machining operation 320, at least one portion of first external surface 21 comprised in first layer 2 is made with a warped surface having a particular curved shape, and, prior to performing first transfer operation 400, a warped sacrificial support is made, which corresponds to the particular curved shape to which at least one decorative element 3 is affixed with an adhesive fastening. More particularly, during initial operation 100, base 1 is made with geometric marker elements, and the warped sacrificial support is made with marker elements complementary to the marker elements of base 1 for the exact relative positioning thereof prior to the bonding of each decorative element 3 carried by the sacrificial support.

According to a particular feature, during initial operation 100, at least one base 1 is made with at least one machined receiving surface for receiving at least one decorative element 3 or one marking 5. This receiving surface may be a projecting surface with respect to base 1, or a recessed surface, such as a counterbore, a groove, or a hollow, which allows both the positioning and the insertion of added mechanical components such as appliques or indices or otherwise, According to a particular feature, during initial operation 100, at least one base 1 is made with at least one hollow housing for receiving an intermediate decorative layer in a coloured material different from the material of base 1.

According to a particular feature, during intermediate machining operation 320, at least one hollow housing is made in first layer 2 for receiving at least one decorative element 3 or for receiving an intermediate decorative layer in a coloured material different from the material of base 1 and/or the material of first layer 2.

According to a particular feature, between first coating operation 300 and second coating operation 500, at least one intermediate coating operation is performed during which there is deposited or affixed, in at least one housing, an intermediate decoration in a coloured material different from the material of base 1 and/or the material of first layer 2. More particularly, the intermediate coating operation is performed by depositing an intermediate layer of coloured material, followed by a machining and/or polishing operation to confine the intermediate layer only to each housing in which the intermediate layer is deposited.

According to a particular feature, an acrylic or epoxy varnish is chosen as the material of second layer 4.

According to a particular feature, during initial operation 100, a mother-of-pearl substrate is chosen, which may be natural mother-of-pearl or synthetic mother-of-pearl.

According to a particular feature, during initial operation 100 a ceramic substrate is chosen.

According to a particular feature, the timepiece component is fabricated to form an external element or a dial.

The invention also concerns a watch 1000 including at least one timepiece component made by the method. The invention also concerns a piece of jewellery comprising at least one component made by the method.

Naturally, the invention is advantageous, not only for timepiece components, but also for jewellery or jewellery components, or spectacles or fashion items.

The invention claimed is:

1. A method for fabricating a composite timepiece or jewellery component comprising at least one decoration affixed to a substrate which has at least one apparent surface intended to remain visible, wherein the following operations are performed in this order:
    in an initial operation, making a base in the substrate which has at least one apparent surface intended to remain visible;
    in a first polishing operation, mirror polishing each said apparent surface intended to be seen by the user;
    performing a first coating operation wherein each said polished apparent surface comprised in said base is coated with a deposition of a first transparent or coloured semi-transparent layer of a first material in a dry process, or PVD or CVD or ALD process, or lacquering or zapon varnish process;
    performing an intermediate machining operation wherein geometric alignment is performed on said first layer and/or a polishing operation is performed on a first external surface of said first layer;
    performing a first transfer operation of affixing and bonding at least one decorative element on the first external surface comprised in said first layer;
    performing a second coating operation wherein said first layer and each said decorative element carried by said first layer is coated with a deposition of a second layer of a transparent treatment material in a dry process, or PVD or CVD or ALD process, or lacquering or zapon varnish process,
    wherein, during said initial operation, said at least one apparent surface is made with a particular curved shape, and wherein, prior to performing said first transfer operation, said first layer is made, and the first external surface of said first layer corresponds to said particular curved shape, said at least one said decorative element being affixed to the first external surface of said first layer with an adhesive fastening during said first transfer operation, and
    wherein, during said initial operation, said base is made with marker elements, and wherein said first layer is made with marker elements complementary to the marker elements of said base for the exact relative positioning thereof prior to the bonding of each said decorative element carried by said first layer.

2. The method according to claim 1, wherein, after said second coating operation, in a final machining operation, geometric alignment is performed on said second layer and/or a polishing operation is performed on a second external surface comprised in said second layer.

3. The method according to claim 1, wherein, prior to the execution of said second coating operation, a second transfer operation is performed, during which at least one marking is applied by pad printing to said first external surface of said first layer.

4. A method for fabricating a composite timepiece or jewellery component comprising at least one decoration affixed to a substrate which has at least one apparent surface intended to remain visible, wherein the following operations are performed in this order:
   in an initial operation, making a base in the substrate which has at least one apparent surface intended to remain visible;
   in a first polishing operation, mirror polishing each said apparent surface intended to be seen by the user;
   performing a first coating operation wherein each said polished apparent surface comprised in said base is coated with a deposition of a first transparent or coloured semi-transparent layer of a first material in a dry process, or PVD or CVD or ALD process, or lacquering or zapon varnish process;
   performing an intermediate machining operation wherein geometric alignment is performed on said first layer and/or a polishing operation is performed on a first external surface of said first layer;
   performing a first transfer operation of affixing and bonding at least one decorative element on the first external surface comprised in said first layer;
   performing a second coating operation wherein said first layer and each said decorative element carried by said first layer is coated with a deposition of a second layer of a transparent treatment material in a dry process, or PVD or CVD or ALD process, or lacquering or zapon varnish process,
   during said intermediate machining operation, the geometric alignment is performed such that at least one portion of said first external surface comprised in said first layer has a particular curved shape, and wherein, during the performing said first transfer operation, said at least one said decorative element is affixed to said at least one portion of said first external surface comprised in said first layer with an adhesive fastening, and
   wherein, during said initial operation, said base is made with marker elements, and wherein said first layer is made with marker elements complementary to the marker elements of said base for the exact relative positioning thereof prior to the bonding of each said decorative element carried by said first layer.

5. The method according to claim 1, wherein, during said initial operation said base is made with at least one machined receiving surface for receiving at least one said decorative element or one marking.

6. The method according to claim 1, wherein, during said initial operation, said base is made with at least one hollow housing for receiving an intermediate decorative layer in a coloured material different from the material of said base.

7. The method according to claim 1, wherein, during said intermediate machining operation, at least one hollow housing is made in said first layer for receiving at least one said decorative element or for receiving an intermediate decorative layer in a coloured material different from the material of said base and/or the material of said first layer.

8. The method according to claim 6, wherein, between said first coating operation and said second coating operation, at least one intermediate coating operation is performed during which there is deposited or affixed, in at least one said housing, an intermediate decoration in a coloured material different from the material of said base and/or the material of said first layer.

9. The method according to claim 7, wherein, between said first coating operation and said second coating operation, at least one intermediate coating operation is performed during which there is deposited or affixed, in at least one said housing, an intermediate decoration in a coloured material different from the material of said base and/or the material of said first layer.

10. The method according to claim 8, wherein said intermediate coating operation is performed by depositing an intermediate layer of said coloured material, and wherein a machining and/or polishing operation is then performed to confine said intermediate layer to each said housing wherein said intermediate layer is deposited.

11. The method according to claim 9, wherein said intermediate coating operation is performed by depositing an intermediate layer of said coloured material, and wherein a machining and/or polishing operation is then performed to confine said intermediate layer to each said housing wherein said intermediate layer is deposited.

12. The method according to claim 1, wherein an acrylic or epoxy varnish is chosen as the material of said second layer.

13. The method according to claim 1, wherein, during said initial operation a mother-of-pearl substrate is chosen.

14. The method according to claim 1, wherein, during said initial operation a ceramic substrate is chosen.

15. The method according to claim 1, wherein said timepiece component is fabricated to form an external element or a dial.

16. A watch comprising at least one timepiece component made by the method according to claim 1.

17. The method according to claim 1, wherein the first coating operation and the second coating operation are each performed with the PVD or the CVD or the ALD process.

* * * * *